Patented Mar. 9, 1943

2,313,275

UNITED STATES PATENT OFFICE 2,313,275

FEED

Herman H. Schopmeyer, Hammond, Ind., assignor to American Maize-Products Company, a corporation of Maine No Drawing. Application December 3, 1940, Serial No. 368,319

7 Claims. (Cl. 99—9)

This invention relates to feed, particularly to a protein-containing composition made from low priced raw materials but of high nutritional value in animal metabolism.

Raw materials available for use in the manufacture of feedstuffs are the non-volatile material of corn steep water and the molasses obtained as mother liquor from crystallizing sugar from concentrated starch conversion syrup. Both these raw materials are by-products of the corn refining industry. They are produced in large quantities and have no substantial uses at attractive prices.

The non-volatile material, mostly solids, from corn steep water corresponds ordinarily to 3 to 4 pounds or so for each bushel of corn steeped. The material consists largely of proteins that are soluble (dispersible) in water and inorganic salts containing a substantial amount of a derivative of inosite-phosphoric acid, the term "derivative" being used herein to include the acid itself, its salts such as phytin, or other phosphorus-containing derivatives of the acid. Such derivatives are considered to be effective in promoting certain metabolic processes.

The molasses contains an appreciable part of the total of the starch conversion products including dextrin, sugar, and inorganic materials appearing as ash in a chemical analysis.

I have now discovered that an excellent feed is that made by growing yeast in a mixture of corn molasses and corn steep water. The product so produced is assimilated as to its protein content to a high extent and is more desirable than steep water protein and yeast used separately in feeds. Furthermore, the product made according to my method includes inorganic materials derived from the steep water and molasses, these materials being of value not only during the time of growing the yeast but also in the use of the resulting material as a feed.

In general, my invention comprises a feed containing the product resulting from forming a mixture of water soluble grain protein, fermentable carbohydrate, and yeast, and subjecting the mixture to fermentation. For best results in feeding the yeast is present in proportion in excess of that of the grain protein, suitably in the proportion of one part of yeast to a fourth to one part of the said protein. When yeast is present in such proportion, the content of lysine is of the same order as the percentage of tyrosine present and the feed is characterized by high assimilability.

Proportions here and elsewhere herein are expressed as parts by weight on the dry basis unless otherwise stated.

In the preferred practice of the invention, the yeast is grown directly in a mixture of corn steep water and molasses from the corn refining industry and in the presence of the inorganic materials of the steep water and the molasses.

Water is added to the mixture if necessary to adjust the concentration of it to that suitable for fermentation with rapid growth of yeast. At the same time, excessive dilution is avoided. A suitable concentration of the material for fermentation is one corresponding to about 4 to 10, preferably 6 to 8, parts of total solids for 100 parts of the mixture.

Yeast in a minor proportion is added to the mixture to initiate the fermentation.

For this purpose a strain of yeast is developed by subculturing in a dilute solution of the fermentable mixture under strong aeration. A strain of yeast so developed, when inoculated into the mixture to be fermented and fermentation is effected, gives a high yield of yeast, rapid fermentation, and a minimum production of alcohol. The yeast selected for subculturing may be any kind adapted to give a high yield of yeast, brewers' yeast being especially suitable. The usual technique of subculturing is employed except unless otherwise stated.

Once my method is in continuous operation, a portion of the yeast grown in a previous batch is used for the next fermentation. The fermentation is conducted under conditions that are well known for promoting the growth of yeast and minimizing the production of alcohol.

When the fermentation is practically complete, the fermented mixture may be partially or largely dewatered. The finished product is made either into a wet composition suitable for feeding or into a dry feed that may be packed for shipment in bags or other suitable containers for solid material.

If the product is to be dewatered, the fermented mixture is subjected to evaporation, say at about 120° to 160° F. in an evaporator operated at about 26 to 28 inches of vacuum.

For some purposes the yeast produced in the fermentation may be separated, as by filtration, before the evaporation is effected. In such a case the product of the evaporation of the steep water is mixed with the yeast previously separated.

Although particularly good results have been obtained when the yeast is grown in the mixture of steep water and fermentable material, yeast grown separately may be mixed with the corn steep water solids for some purposes, the yeast being added in such case either before or after the removal of water from the corn steep water.

A specific example of the practice of the invention follows.

Corn sugar molasses is mixed with corn steep water in the proportion of 4 lbs. of solids in the molasses to approximately 1 lb. of solids in the steep water. The mixture is diluted to a concentration corresponding to 6 to 8% of total solids. To the diluted mixture there is added wet yeast, from a previous fermentation, in the proportion of about 1 lb. of yeast containing about 60 to 70% of water to approximately 200 lbs. of fermentable solids in the mixture to be fermented.

The inoculated mixture is then maintained under conditions favoring the rapid growth of yeast with a minimum production of alcohol.

After the fermentation is nearly complete and has become slow as not to justify continuation from the commercial standpoint, the mixture is processed to provide a partly or nearly completely dewatered product, alcohol being distilled as a foreshot. In one procedure, the yeast present after the fermentation is separated from the remaining liquor, as by filtration or centrifuging, the remaining liquid is then evaporated, and the product of the evaporation mixed with the yeast previously separated.

In the preferred procedure, however, the yeast present in the fermented mixture is not separated, the whole mixture being subjected to vacuum evaporation at low temperatures such as those stated, so as to preserve vitamin activity in the concentrated product.

A feed so made has a lysine content of approximately 2%, this proportion being substantially equal to that of tyrosine and isoleucine which are relatively abundant in corn steep water solids. In addition there is present a satisfactory proportion of a derivative of inositephosphoric acid. The feed obtained is of a high degree of protein assimilability and contains desirable inorganic material in substantial amount.

A composition of high nutritional value made as described is useful as an ingredient in compounding feeds. When so used there may be produced a satisfactory feed having a high ratio of carbohydrate to protein, as compared to carbohydrate content of feeds made similarly by adding either steep water solids or yeast alone to the carbohydrates.

In place of the corn molasses described in the above example, there may be used other carbohydrate fermentable by yeast, as, for example, cane or beet sugar molasses, corn syrup, or the like. Various proportions may be used in the mixture to be fermented, as for example 2 to 5 parts of fermentable solids for 1 part of steep water solids.

Using a mixture of 4 lbs. of fermentable carbohydrate material to 1 lb. of corn steep water solids on the dry basis, there has been obtained a mixture ready for fermentation which has the following proximate analysis:

| | Parts |
|---|---|
| Proteins | 11.9 |
| Reducing sugars | 76.0 |
| Ash | 9.8 |

The above mixture was diluted to a concentration corresponding to about 6 to 8% of solids. The diluted mixture was subjected to fermentation by inoculation with 2 lbs. of wet yeast, of about 65% moisture content, for 500 lbs. of dry weight of the mixture and keeping the whole at a temperature of 80 to 85° F. for 24 to 36 hours, conditions being so controlled as to favor the growth of yeast and minimize production of alcohol.

The material remaining after the fermentation was found to be of the following composition:

| | Per cent |
|---|---|
| Reducing substances calculated as dextrose | 14 |
| Proteins | 28 |
| Ash | 24 |

The yield of yeast was approximately 40 to 50 parts for 100 parts of sugar content of the mixture subjected to fermentation.

The fermented liquor was then concentrated under vacuum, care being taken that the liquor was not allowed to become overheated. The evaporation was continued until the solids content corresponded to 60 to 70% of the whole. At such a concentration, the composition is resistant to bacterial action for a considerable period of time. Furthermore, such a material is suitable for incorporation with crude fibre, additional carbohydrate, or other materials in the making of a mixed feed. If desired, however, the mixture may be further concentrated until there is obtained a nearly dry product that may be packaged and sold either as a protein enrichment for feeds or as an ingredient for the makers of compounded feeds.

The ratios to each other of essential amino acids in the non-volatile material remaining after the fermentation of the mixture of steep water and corn sugar molasses, are shown in the following table, the percentages shown being the approximate numbers of parts of the several amino acids for 100 parts dry weight of protein present. The proportions of the several amino acids that are satisfactory in making a feed of high nutritional value may be about a third or so lower or higher than the proportions shown.

*Percentage of amino acids in protein content of Yeast-steep-water mixture after fermentation*

| Ingredient: | Approximate percentage in protein present |
|---|---|
| Cystine | 1.0 |
| Methionine | 2.0 |
| Tyrosine | 1.9 |
| Tryptophane | 2.4 |
| Phenylalanine | 1.2 |
| Arginine | 1.5 |
| Histidine | 2.0 |
| Lysine | 2.3 |
| Threonine | 2.4 |
| Valine | 1.5 |
| Leucine | 7.3 |
| Isoleucine | 2.0 |

The amino acids referred to herein are combined, not free, in the protein of the feed.

While the invention has been described in connection with the use of yeast as the ferment, other types of micro-organisms may be substituted for the yeast, as for example, torula, lactic acid organisms, or other organisms capable of being grown in a mixture of corn steep water and molasses and giving a satisfactory yield of the organism per unit of weight of material fermented, and amino acids of kind and in amount to correct for deficiencies of essential amino acids in the solids of corn steep water.

The compositions made as described are useful particularly as a compounding ingredient in a milk producing dairy ration or a laying ration for hens and as a protein supplement for hog feed.

It is understood that the details given are for the purpose of illustration and that variations within the spirit of the invention are intended to be included within the scope of the appended claims.

What I claim is:

1. A feed compounding ingredient of high nutritional value comprising yeast, water soluble grain protein, and a phosphorus containing derivative of inosite-phosphoric acid, the yeast and grain protein serving to increase the nutritional value of each other and the proportion of the yeast being at approximately 100 to 400 parts for 100 parts of the grain protein.

2. A feed of high nutritional value comprising yeast and grain protein that is substantially completely water soluble, the proportion of yeast being in excess of the grain protein.

3. A feed of high nutritional value comprising yeast and the protein of corn steep water, the proportions being about 1 part of yeast to 0.25 to 1 part of the said protein.

4. A feed compounding ingredient of high nutritional value comprising yeast, the non-volatile materials of corn steep water, and corn sugar molasses, each of the said ingredients being present in substantial amounts and the yeast providing lysine in amount to make the total lysine present approximately 2 parts for 100 parts of the feed.

5. A feed comprising a mixture of yeast and non-volatile material of corn steep water, the said material including water soluble protein and a substantial proportion of an assimilable derivative of inosite-phosphoric acid and the proportion of the yeast being in excess of the water soluble protein of the steep water.

6. A feed of high nutritional value comprising yeast and water soluble grain protein, the feed containing tyrosine and lysine, the proportion of lysine being at least approximately equal to the proportion of tyrosine, and the yeast being in excess of the water soluble grain protein.

7. A feed of high nutritional value comprising yeast and water soluble grain protein, the yeast being present in proportion in excess of the water soluble grain protein and the feed containing amino acids in about the following proportions: cystine 1 part, methionine 2 parts, tyrosine, 1.9, tryptophane 2.4, phenylalanine 1.2, arginine 1.5, histidine 2, lysine 2.3, threonine 2.4, valine 1.5, leucine 7.3, and isoleucine 2.

HERMAN H. SCHOPMEYER.